United States Patent
Van Allen

(10) Patent No.: US 7,520,464 B1
(45) Date of Patent: Apr. 21, 2009

(54) SPINNING THREAT ROLL BEARING ESTIMATOR

(75) Inventor: Russell N. Van Allen, Melbourne, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 186 days.

(21) Appl. No.: 11/326,033

(22) Filed: Jan. 4, 2006

Related U.S. Application Data

(60) Provisional application No. 60/641,513, filed on Jan. 4, 2005.

(51) Int. Cl.
F42B 15/01 (2006.01)
F42B 15/00 (2006.01)

(52) U.S. Cl. .............. 244/3.19; 244/3.1; 244/3.15; 342/61; 342/62

(58) Field of Classification Search ........... 244/3.1–3.3; 342/25 R, 25 A, 25 C, 61, 62, 104, 107, 113, 342/114, 118, 134, 139–147, 156, 175, 195, 342/417–449, 413, 461; 89/1.11
See application file for complete search history.

(56) References Cited

U.S. PATENT DOCUMENTS

| | | | | |
|---|---|---|---|---|
| 2,644,397 A * | 7/1953 | Katz | .......... | 244/3.15 |
| 3,001,186 A * | 9/1961 | Baltzer | .......... | 244/3.11 |
| 3,434,144 A * | 3/1969 | Cooper | .......... | 342/413 |
| 3,631,485 A * | 12/1971 | Beazell, Jr. | .......... | 244/3.13 |
| 3,677,500 A * | 7/1972 | Brown et al. | .......... | 244/3.13 |
| 3,735,399 A * | 5/1973 | Sletten et al. | .......... | 342/107 |
| 3,740,002 A * | 6/1973 | Schaefer | .......... | 244/3.19 |
| 3,766,556 A * | 10/1973 | Amoroso, Jr. | .......... | 342/156 |
| 3,897,918 A * | 8/1975 | Gulick et al. | .......... | 244/3.19 |
| 3,970,269 A * | 7/1976 | Conforti | .......... | 244/3.16 |
| 4,006,356 A * | 2/1977 | Johnson et al. | .......... | 244/3.16 |
| 4,131,891 A * | 12/1978 | Stavis | .......... | 342/461 |
| 4,204,655 A * | 5/1980 | Gulick et al. | .......... | 244/3.19 |
| 4,264,907 A * | 4/1981 | Durand et al. | .......... | 244/3.15 |
| 4,350,983 A * | 9/1982 | Blaha et al. | .......... | 244/3.19 |
| 4,466,067 A * | 8/1984 | Fontana | .......... | 342/424 |
| 4,509,052 A * | 4/1985 | Cash | .......... | 342/418 |
| 4,771,290 A * | 9/1988 | Storey, Jr. | .......... | 342/424 |
| 4,794,395 A * | 12/1988 | Cindrich et al. | .......... | 342/424 |
| 4,992,796 A * | 2/1991 | Apostolos | .......... | 342/156 |
| 5,426,438 A * | 6/1995 | Peavey et al. | .......... | 342/433 |
| 5,784,156 A * | 7/1998 | Nicholson | .......... | 244/3.16 |
| 6,724,341 B1 * | 4/2004 | Pereira et al. | .......... | 342/62 |

* cited by examiner

*Primary Examiner*—Bernarr E Gregory
(74) *Attorney, Agent, or Firm*—Jeffrey D. Myers; Peacock Myers, P.C.; Timothy D. Stanley

(57) ABSTRACT

An apparatus and method for determining a bearing from a spinning projectile to a target emitting electromagnetic radiation comprising disposing a plurality of electromagnetic radiation sensors on a body of the projectile, receiving sensed electromagnetic radiation from the plurality of sensors, determining a periodic phase modulation between pairs of the plurality of sensors, integrating the modulation over a plurality of revolutions of the projectile, and calculating a bearing estimate from the projectile to the target using the integration.

20 Claims, 4 Drawing Sheets

SPINNING THREAT ROLL BEARING ESTIMATOR

CROSS-REFERENCE TO RELATED APPLICATIONS

This application claims priority to and the benefit of the filing of U.S. Provisional Patent Application Ser. No. 60/641,513, entitled "Spinning Threat Roll Bearing Estimator", filed on Jan. 4, 2005, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods and apparatuses for obtaining an accurate bearing from a spinning projectile to a target emitting electromagnetic radiation.

2. Description of Related Art

The present invention provides the capability to locate cell-phone emitters rapidly before they can shut down. Other solutions to this problem involve either requiring that the emitter remain operational at least until munition apogee or by requiring additional assets such as a trailing wire antenna or a ground base station. With the present invention, only the antennas organic to the munition are required and emitter location is determined during the ascent phase of the flight.

BRIEF SUMMARY OF THE INVENTION

The present invention is of an apparatus and method for determining a bearing from a spinning projectile to a target emitting electromagnetic radiation, comprising: disposing a plurality of electromagnetic radiation sensors on a body of the projectile; receiving sensed electromagnetic radiation from the plurality of sensors; determining a periodic phase modulation between pairs of the plurality of sensors; integrating the modulation over a plurality of revolutions of the projectile; and calculating a bearing estimate from the projectile to the target using the integration. In the preferred embodiment, the electromagnetic radiation is radio frequency radiation and the sensors comprise an aperture narrower than a frequency of the electromagnetic radiation. Selectable front-end filters between the sensors and the data processing element are preferably employed. The sensors preferably number four and are placed circumferentially around the body of the projectile. When two of the sensors are centered on the target, the range difference between the two of the sensors is zero. Phase/gain mismatches between channels are nulled. Preferably, the frequency of the electromagnetic radiation is 100 MHz or greater and the projectile is a munition.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
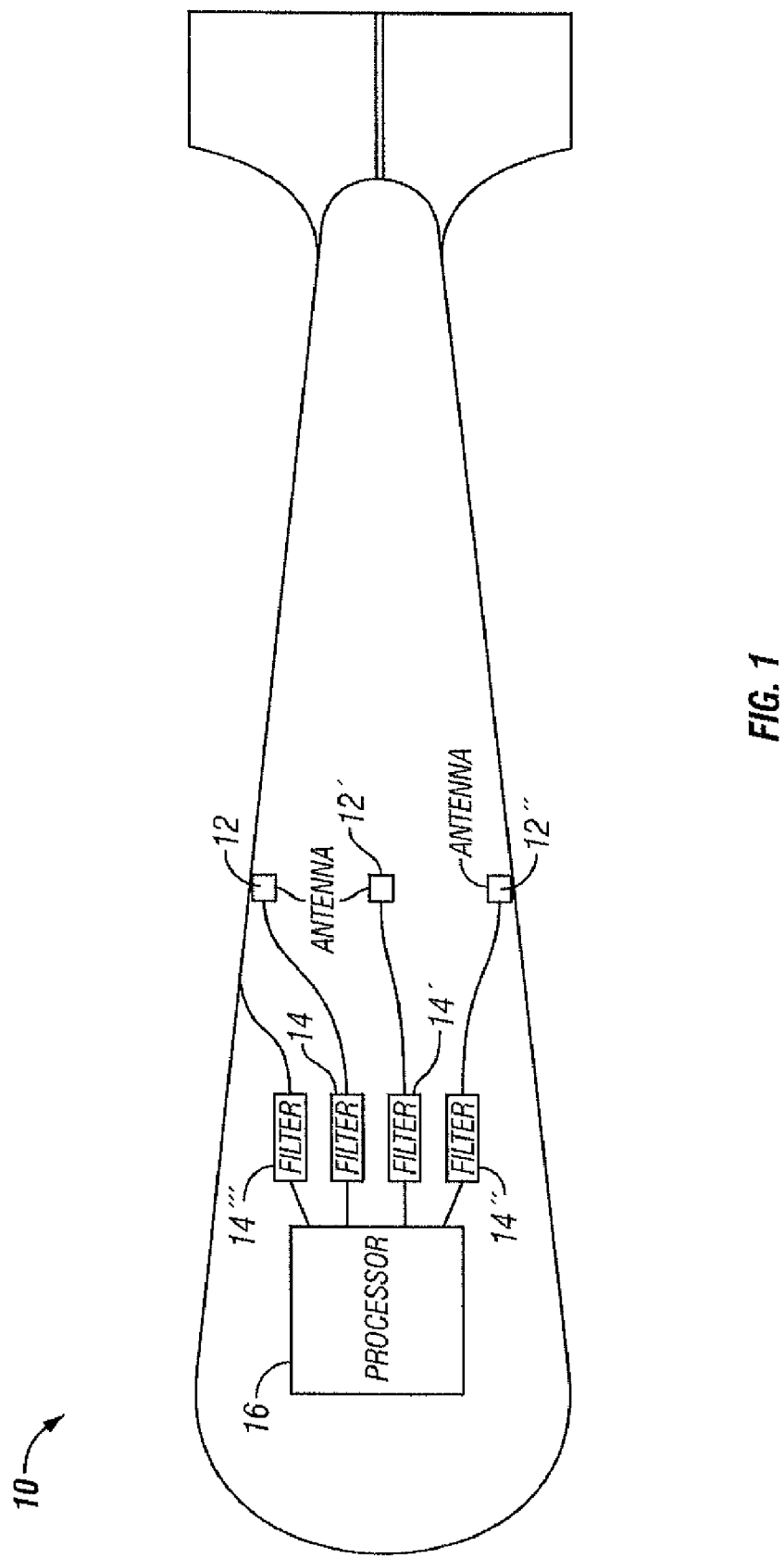
FIG. 1 is a schematic diagram of the preferred apparatus according to the invention.

The Spinning Threat Roll Bearing Estimator (STROBE) of the invention is a method and apparatus that provides highly accurate bearing to an emitting target. The bearing is determined using passive location techniques during flight of a spinning object to obtain refined target location errors (TLE) small enough to be effective, e.g., with a mortar munition. The invention allows a spinning (rotating) munition (or other type of moving) body to accurately locate electromagnetic radiation (e.g., Radio Frequency (RF)) emitting devices with respect to the munition body. The invention allows for antennas with apertures less than the wavelength of the emitter to be located with respect to the munition body. The invention is compatible with standard techniques for guiding to the emitter currently used during the final descent phase of a munition's trajectory. These include phase or amplitude interferometry across the nose of the munition and doppler maximization to refine the emitter location, if the emitter remains in transmit operation.

STROBE is preferably used through the flight with the rotation of the munition body providing the scanning mechanism. Selectable front-end filters narrow the frequency search band. Using time of arrival measurements from the antenna array, STROBE mathematically computes and accurately locates the emitter. By coherently multiplying adjacent antenna pairs placed circumferentially around the munition, a periodic phase modulation is induced (see FIG. 3). This is a result of changing range difference between the elements caused by the spinning motion. When two antennas of the four (preferred number) are centered on the target, the range difference is zero. By integrating over many roll cycles, this position can be accurately determined and an angle "strobe" to the emitter is generated.

In the preferred embodiment, the invention comprises the following characteristics: (1) Four antennas are mounted circumferentially around the munition body; (2) Rotation of the munition body provides the scanning mechanism; (3) Selectable front-end filters narrow the frequency search band; (4) By coherently multiplying adjacent antenna pairs, a periodic phase modulation is induced (this is a result of changing range difference between elements caused by the spinning); (5) When two antennas are centered on the target, the range difference is zero; (6) By integrating over many roll cycles, this position can be accurately determined and an angle "strobe" to the emitter is generated; and (7) Integrating strobes over time during the munition flight provides emitter location.

The multiplicative receiver concept embodied in STROBE has several advantages over more traditional approaches, including: (1) The process is not dependent on signal type or modulation; (2) Phase/gain mismatches between channels are nulled, thus eliminating channel balance issues and reducing calibration requirements; (3) Matched filtering process extracts highest signal-to-noise ratio (SNR); (4) Rapid bearing estimation for guiding in azimuth; and (5) Accurate angle estimates for effective tactical passive ranging.

FIG. 1 illustrates the preferred apparatus 10 according to the invention. A plurality of antennas 12,12',12",12''' (12'''' not shown) are located on the circumference of the spinning object. These provide signals to front-end filters 14,14',14", 14''' employed to narrow the detected frequency range, if desired. The filters then provide resulting signals to processor 16, which employs the methods of the invention to determine angle to target.

Figure 2:
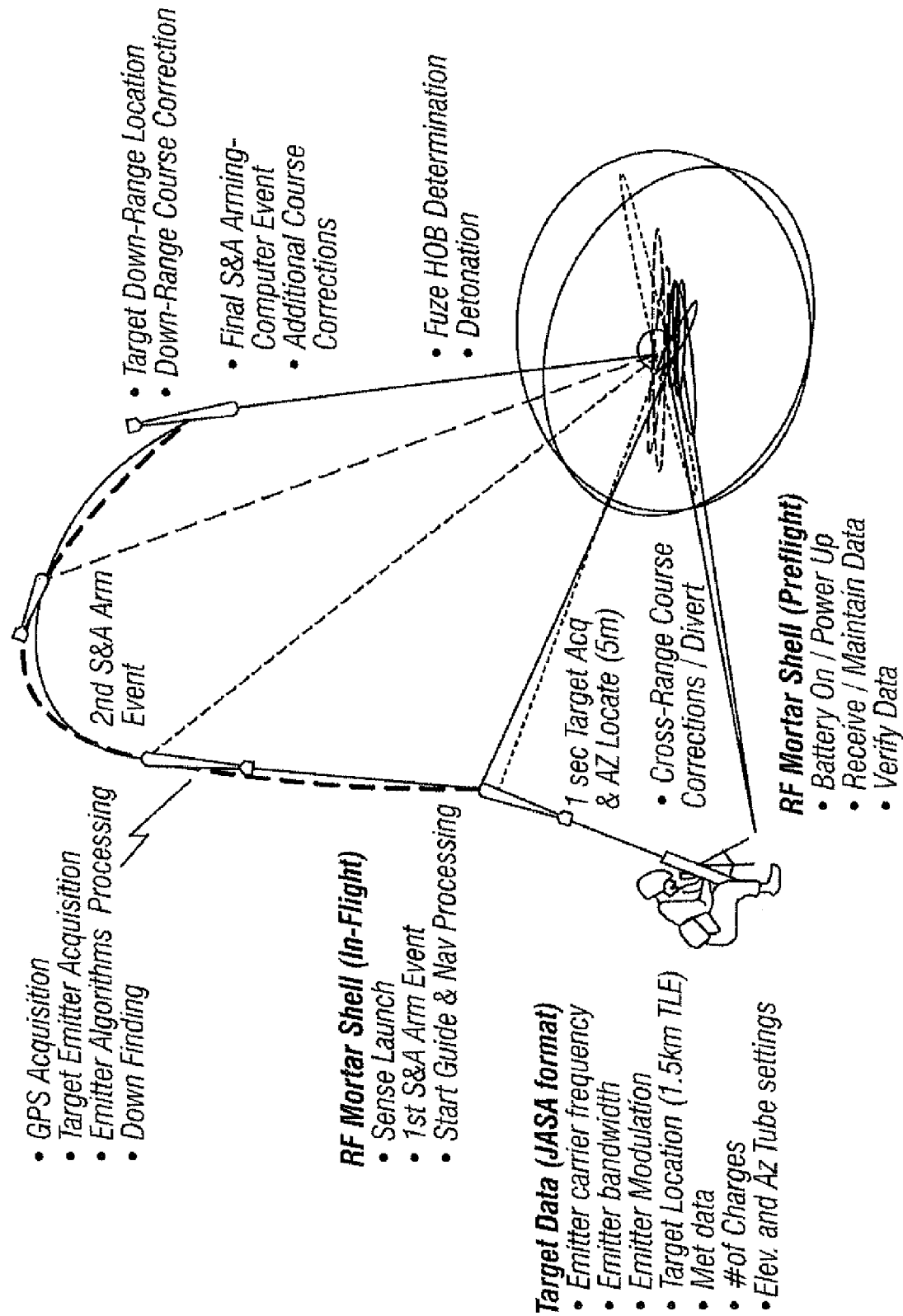
FIG. 2 illustrates the operation of the apparatus in flight.
Figure 3:
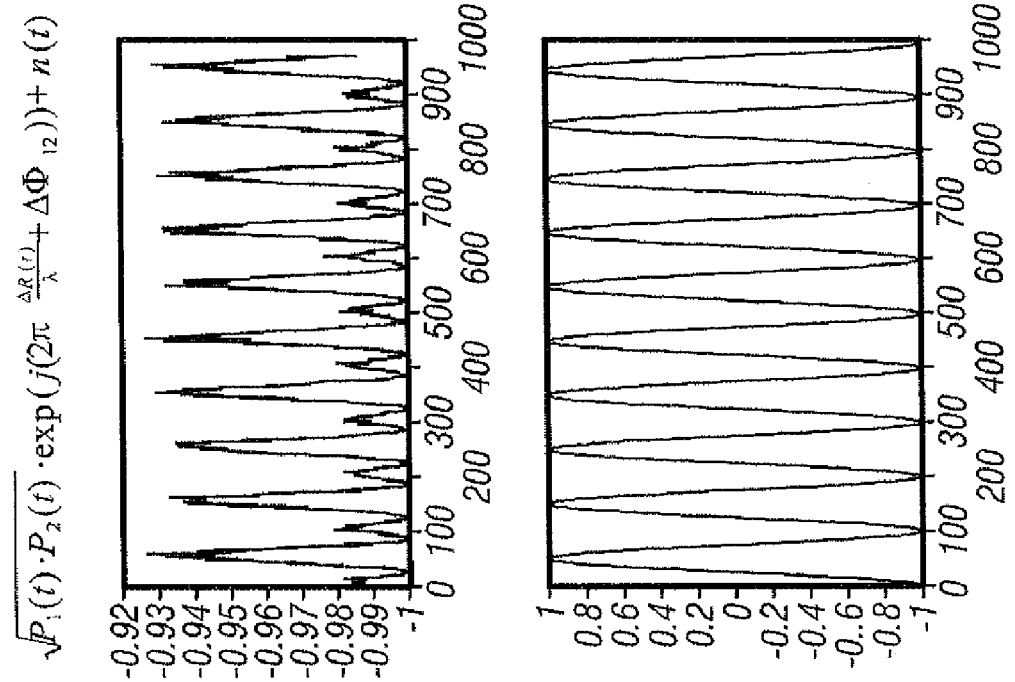
FIG. 3 illustrates the operation of the invention to accurately measure roll angle to a target.
Figure 3:
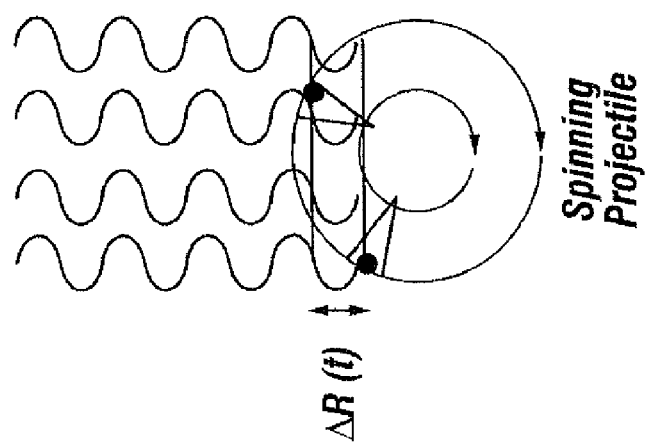
Figure 4:
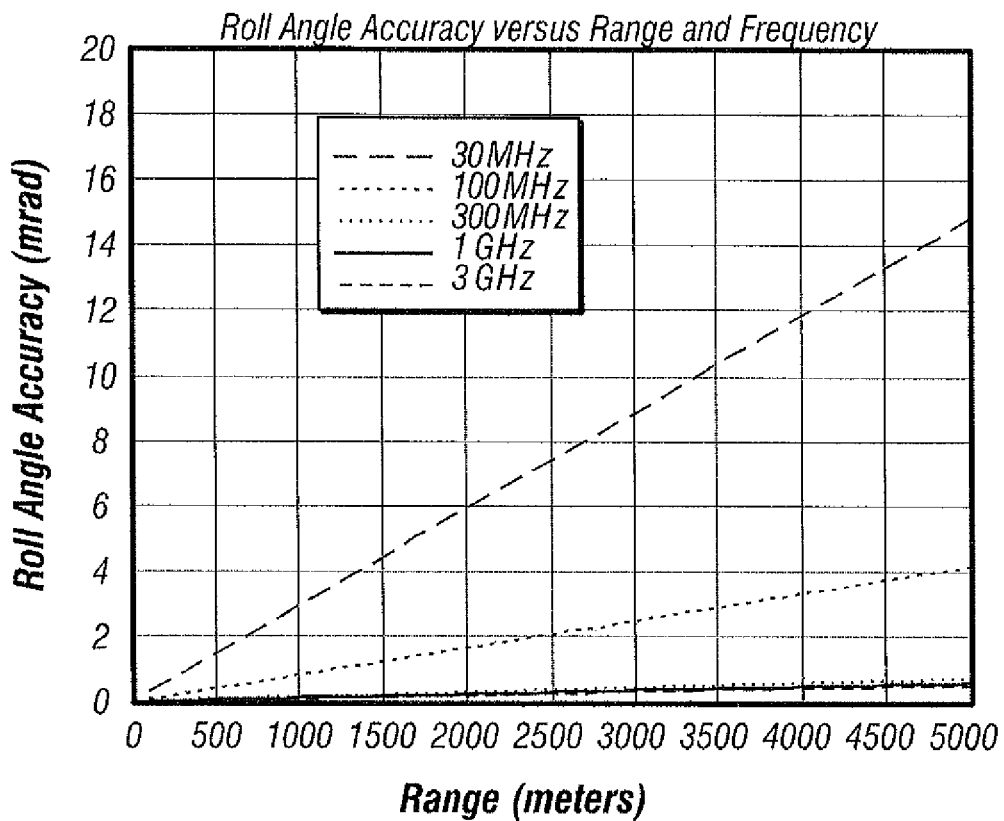
FIG. 4 is a graph of roll angle accuracy of the invention versus range and frequency.
Figure 5:
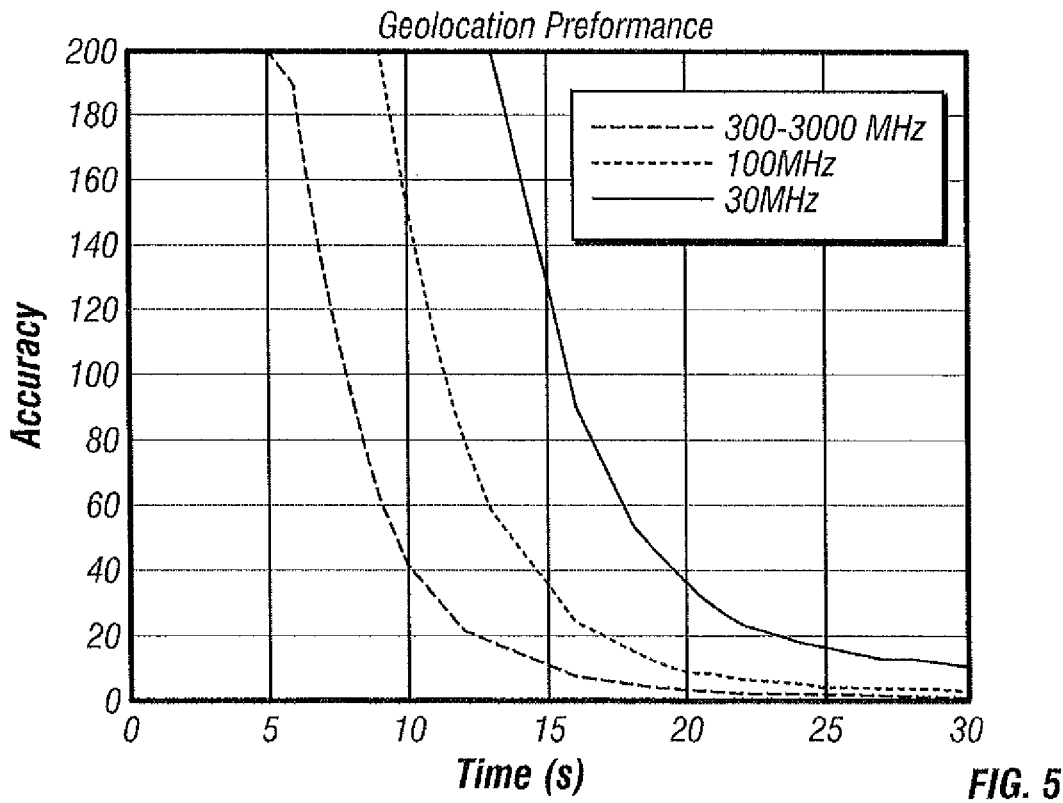
FIG. 5 is a graph of the geolocation performance of the invention, charting accuracy in meters versus time of operation of the invention.

FIG. 2 illustrates use of the invention in a mortar shell which determines target location during the ascending portion of flight, wherein: $P_1(t)$ and $P_2(t)$ are the received signal powers at the two antennas which fluctuate with antenna gain as the munition rolls and includes the effect of the fixed amplitude mismatch between the two channels: $\Delta R(t)$ is the fluctuating difference in emitter range between the antenna phase centers: $\lambda$ is the wavelength of the emitter signal: $\Delta \Phi_{12}$ is the fixed phase mismatch between the two antenna channels; and n(t) is the noise process including thermal noise and sampling effects. FIG. 3 illustrates the processing of received signals to determine roll angle to target according to the invention and as understood by one of ordinary skill in the art. FIG. 4 shows that the present invention provides good roll angle accuracy down to at least 100 MHz. FIG. 5 shows that the present invention provides excellent geolocation down to 100 MHz with 20 sec of operation of the invention in-flight.

To summarize, the present invention allows a spinning (rotating) munition (or other type of moving) body to rapidly and accurately locate RF emitting devices with respect to the munition body.

The invention allows small antenna apertures (less than a wavelength) to be used to locate the emitter with respect to the munition body.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for determining a bearing from a spinning projectile to a target emitting RF radiation, said apparatus comprising:
    a plurality of RF radiation antennas disposed on a body of the projectile; and
    a data processing element receiving RF radiation from said plurality of antennas, said element determining a periodic phase modulation between pairs of said plurality of antennas, integrating the modulated signal over a plurality of revolutions of the projectile, and calculating a bearing estimate from the projectile to the target using the integration of the modulated signal.

2. The apparatus of claim 1 wherein said antennas comprise an aperture narrower than a wavelength of the RF radiation.

3. The apparatus of claim 1 additionally comprising selectable front-end filters between said antennas and said data processing element.

4. The apparatus of claim 1 wherein said antennas number four.

5. The apparatus of claim 1 wherein said antennas are placed circumferentially around the body of the projectile.

6. The apparatus of claim 5 wherein when two of said antennas are centered on the target, the range difference between said two of said antennas is zero.

7. The apparatus of claim 1 wherein phase/gain mismatches between channels are nulled.

8. The apparatus of claim 1 wherein frequency of the RF radiation is 100 MHz to 300 GHz.

9. The apparatus of claim 1 wherein the projectile is a munition.

10. The apparatus of claim 1 wherein said apparatus provides a geolocation accuracy as to the target within 10 meters down to 100 MHz with 20 seconds of operation.

11. A method for determining a bearing from a spinning projectile to a target emitting electromagnetic radiation, the method comprising the steps of:
    disposing a plurality of RF radiation antennas on a body of the projectile;
    receiving RF radiation from the plurality of antennas;
    determining a periodic phase modulation between pairs of the plurality of antennas;
    integrating the modulated signal over a plurality of revolutions of the projectile; and
    calculating a bearing estimate from the projectile to the target using the integration of the modulated signal.

12. The method of claim 11 wherein the antennas comprise an aperture narrower than a wavelength of the RF radiation.

13. The method of claim 11 additionally comprising the step of employing selectable front-end filters between the antennas and the data processing element.

14. The method of claim 11 wherein the antennas number four.

15. The method of claim 11 wherein in the disposing step the antennas are placed circumferentially around the body of the projectile.

16. The method of claim 15 wherein when two of the antennas are centered on the target, the range difference between the two of the antennas is zero.

17. The method of claim 11 wherein phase/gain mismatches between channels are nulled.

18. The method of claim 11 wherein frequency of the RF radiation is 100 MHz to 300 GHz.

19. The method of claim 11 wherein the projectile is a munition.

20. The method of claim 11 wherein the method provides a geolocation accuracy as to the target within 10 meters down to 100 MHz with 20 seconds of operation.

* * * * *